United States Patent
Spreitzer et al.

(10) Patent No.: US 6,541,602 B1
(45) Date of Patent: Apr. 1, 2003

(54) CONJUGATED POLYMERS CONTAINING 2,7 FLUORENYL UNITS WITH IMPROVED PROPERTIES

(75) Inventors: Hubert Spreitzer, Viernheim (DE); Heinrich Becker, Glashütten (DE); Willi Kreuder, Mainz (DE)

(73) Assignee: Celanese Ventures GmbH (DE)

( * ) Notice: Subject to any disclaimer, the term of this patent is extended or adjusted under 35 U.S.C. 154(b) by 0 days.

(21) Appl. No.: 09/806,730

(22) PCT Filed: Sep. 1, 1999

(86) PCT No.: PCT/EP99/06422

§ 371 (c)(1), (2), (4) Date: May 2, 2001

(87) PCT Pub. No.: WO00/22027

PCT Pub. Date: Apr. 20, 2000

(30) Foreign Application Priority Data

Oct. 10, 1998 (DE) .......................... 198 46 768

(51) Int. Cl.[7] .............................. C08G 79/08
(52) U.S. Cl. ................ 528/394; 528/8; 528/397; 528/488; 252/301.16; 252/301.35
(58) Field of Search .................. 528/394, 8, 397, 528/488; 252/301.16, 301.35

(56) References Cited

U.S. PATENT DOCUMENTS 5,777,070 A    7/1998    Inbasekaran et al. ....... 528/394

FOREIGN PATENT DOCUMENTS

| GB | 2313127 | 11/1997 |
|----|---------|---------|
| WO | 9705184 | 2/1997 |
| WO | 9733323 | 9/1997 |
| WO | 9954943 | 10/1999 |

OTHER PUBLICATIONS

Kreyenschmidt et al; Thermally stable blue light emitting copolymers of poly(alkylfluorene), Macromolecules, 1998, vol. 31, No. 4, pp. 1099–1103.*

* cited by examiner

Primary Examiner—Duc Truong
(74) Attorney, Agent, or Firm—Connolly Bove Lodge & Hutz LLP

(57) ABSTRACT

The present invention describes novel polymers, their use as organic semiconductors and/or electroluminescent materials, and electro-luminescent devices containing polymers of this type.

19 Claims, No Drawings

CONJUGATED POLYMERS CONTAINING 2,7 FLUORENYL UNITS WITH IMPROVED PROPERTIES

There is considerable industrial demand for large-area solid-state light sources for a number of applications, predominantly in the area of display elements, display-screen technology and illumination technology. The requirements made of these light sources cannot at present be completely satisfied by any of the existing technologies.

As an alternative to conventional display and illumination elements, such as incandescent lamps, gas-discharge lamps and non-self-illuminating liquid-crystal display elements, electroluminescent (EL) materials and devices, such as light-emitting diodes (LEDs), have already been in use for some time.

Besides inorganic electroluminescent materials and devices, low-molecular-weight, organic electroluminescent materials and devices have also been known for about 30 years (see, for example, U.S. Pat. No. 3,172,862). Until recently, however, such devices were greatly limited in their practical applicability.

WO 90/13148 and EP-A-0 443 861 describe electroluminescent devices which contain a film of a conjugated polymer as light-emitting layer (semiconductor layer). Such devices offer numerous advantages, such as the possibility of manufacturing large-area, flexible displays simply and inexpensively. In contrast to liquid-crystal displays, electroluminescent displays are self-illuminating and therefore do not require an additional illumination source at the back.

A typical device in accordance with WO 90/13148 consists of a light-emitting layer in the form of a thin, dense polymer film (semiconductor layer) containing at least one conjugated polymer. A first contact layer is in contact with a first surface, and a second contact layer is in contact with a further surface of the semiconductor layer. The polymer film of the semiconductor layer has a sufficiently low concentration of extrinsic charge carriers so that, on application of an electric field between the two contact layers, charge carriers are introduced into the semiconductor layer, the first contact layer becoming positive compared with the other layer, and the semiconductor layer emits radiation. The polymers used in such devices are conjugated. The term "conjugated polymer" is taken to mean a polymer which has a delocalized electron system along the main chain. The delocalized electron system gives the polymer semiconductor properties and enables it to transport positive and/or negative charge carriers with high mobility.

For use in EL elements as described in WO 90/13148, very many different polymers have already been proposed. Derivatives of poly(p-phenylenevinylene) (PPV) appear particularly suitable. Such polymers are described, for example, in WO 98/27136. These polymers are particularly suitable for electroluminescence in the green to red spectral region. In the blue to blue-green spectral region, the polymers proposed hitherto are principally those based on poly-p-phenylene (PPP) or polyfluorene (PF). Corresponding polymers are described, for example, in EP-A-0 707 020, WO 97/05184 and WO 97/33323. These polymers already exhibit good EL properties, although development is still not complete by far. Thus, polymers in the blue to blue-green spectral region frequently also exhibit the phenomenon of morphological instability. For example, many polyfluorenes exhibit liquid-crystalline or related behavior, which can result, in thin films, in domain formation, which is in turn unsuitable for the production of a homogeneously luminous area. These polymers also tend to form aggregates, which shifts the electroluminescence into the long-wave region in an undesired manner, and adversely affects the life of the EL elements.

The object of the present invention was therefore to provide polymers which are suitable for emission in the blue and blue-green spectral region and at the same time have improved morphological behavior.

Surprisingly, it has now been found that incorporation of specific comonomers in otherwise typically linear conjugated polymers principally containing 2,7-fluorenyl units significantly improves the morphological properties without losing the very good applicational properties (emission color, quantum yield of the emission, suitability for EL applications). A similar proposal is described in M. Kreyenschmidt et al., Macromolecules 1998, 31, 1099, where it was attempted to increase the morphological stability of polyfluorenes by incorporation of comonomers. However, good results (regarding the morphology) were only found for comonomers which result in interruption of conjugation. However, these interruptions result in general problems (for example lower charge-carrier mobility) when such polymers are used in electronic applications, for example EL devices.

The polymers according to the invention contain randomly or regularly copolymerized comonomer units, which firstly allow electronic conjugation of the entire polymer and secondly cause the polymer to kink in its main chain. For the purposes of the present application, the term "kink along the main polymer chain" is taken to mean that if the polymer containing principally 2,7-fluorenyl units is regarded as a linear rod, the kink causes a significant deviation from linear, i.e. if the longitudinal axis of the 2,7-fluorenyl units is regarded as a straight line, these two units adjacent to the kink have an angle at the intersection which differs significantly from 180° (or 0°); however, the formal conjugation of the polymer is not interrupted here.

The invention relates to conjugated polymers which, besides structural units of the formula (I)

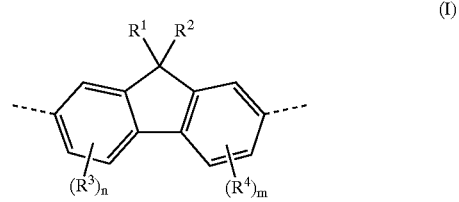

in which
 $R^1$ and $R^2$ are identical or different and are hydrogen, $C_1$–$C_{22}$-alkyl, $C_2$–$C_{20}$-heteroaryl, $C_5$–$C_{20}$-aryl, F, Cl or CN, where the abovementioned alkyl radicals can be branched or unbranched or alternatively can be cycloalkyl radicals, and individual, non-adjacent $CH_2$ groups of the alkyl radical can be replaced by O, S, C=O, COO, N—$R^5$ or simple aryl radicals, where the abovementioned aryl radicals can be substituted by one or more substituents $R^3$. Preference is given to compounds in which $R^1$ and $R^2$ are both identical and are not hydrogen or chlorine. Preference is furthermore given to compounds in which $R^1$ and $R^2$ are different from one another and are also not hydrogen,
 $R^3$ and $R^4$ are identical or different and are $C_1$–$C_{22}$-alkyl, $C_2$–$C_{20}$heteroaryl, $C_5$–$C_{20}$-aryl, F, Cl, CN, $SO_3R^5$ or $NR^5R^6$, where the alkyl radicals can be branched or unbranched or alternatively can be cycloalkyl radicals, and individual, non-adjacent $CH_2$ groups of the alkyl radical can be replaced by O, S, C=O, COO, N—$R^5$ or simple aryl radicals, where the abovementioned aryl radicals can be substituted by one or more non-aromatic substituents $R^3$,
 $R^5$ and $R^6$ are identical or different and are H, $C_1$–$C_{22}$-alkyl, $C_2$–$C_{20}$-heteroaryl or $C_5$–$C_{20}$-aryl, where the alkyl radicals can be branched or unbranched or alternatively can be cycloalkyl radicals, and individual, non-adjacent $CH_2$ groups of the alkyl radical can be replaced by O, S, C=O, COO, N—$R^5$ or simple aryl radicals, where the abovementioned aryl radicals can be substituted by one or more non-aromatic substituents $R^3$, and
 m and n are each an integer 0, 1, 2 or 3, preferably 0 or 1, also contain structural units of the formula (II)

(II)

in which
Ar is a mono- or polycyclic aromatic conjugated system having 5 to 20 carbon atoms, in which one or more carbon atoms can be replaced by nitrogen, oxygen or sulfur and whose linking points are selected so that an angle not equal to 1800, preferably less than 120°, particularly preferably less than 90°, is formed along the main polymer chain.

Particularly suitable radicals Ar (aromatic) are those which, besides the abovementioned kink, also produce a spatial twist of the main polymer chain. This is achieved if the three individual polymers connected by two consecutive kinks cannot be brought into a plane (i.e. a dihedral angle of significantly greater than 0° results).

The polymer according to invention contains at least 1 mol %, preferably from 2 mol % to 50 mol %, of (one or more different) structural units of the formula (II) incorporated randomly, alternately, periodically or in blocks.

Preferred structural units of the formula (II) are selected from aromatic or heteroaromatic structures in which the shortest link between the linking points involves an even number (or 0) atoms bonded to one another.

The structural units of the formula (II) are particularly preferably derived from the following monomers:
benzene derivatives incorporated into the polymer in the 1,2-position;
naphthalene derivatives incorporated into the polymer in the 1,2-, 2,3- or 1,7-position;
anthracene derivatives incorporated into the polymer in the 1,2-, 2,3-, 1,7- or 2,9-position;
phenanthrene derivatives incorporated into the polymer in the 1,2-, 1,8-, 1,9-, 2,3-, 2,5-, 2,10-, 3,4-, 3,6-, 3,9-, 4,5- or 9,10-position;
biphenyl derivatives incorporated into the polymer in the 2,2'- or 2,4'-position;
o-terphenyl derivatives incorporated into the polymer in the 4,4''-position.

The polymers according to the invention are preferably copolymers consisting of the structural units of the formulae (I) and (II). In a further embodiment of the present invention, the polymer according to the invention may also contain different structural units of the formulae (I) and/or (II). Preference is furthermore given to copolymers also containing other structures which do not fall under the structural units (I) and (II). Examples of such further monomers are 1,4-phenylenes and 4,4'-biphenyls, which, if desired, can also carry substituents, preferably branched or unbranched $C_1-C_{22}$-alkyl or -alkoxy groups.

The polymers according to the invention generally have from 10 to 10000, preferably from 10 to 5000, particularly preferably from 50 to 5000, very particularly preferably from 50 to 1000, recurring units.

Particular preference is given to polymers in which m and n are 0. $R^1$ and $R^2$ are both alkyl substituents as defined above or are both aryl substituents as defined above, or $R^1$ corresponds to an alkyl substituent and $R^2$ corresponds to an aryl substituent.

The structural units of the formula (II) are preferably derived from 1,2-phenylene, 2,2'-biphenylene or 4,4''-o-terphenylene.

The polymers according to invention can be built up by a wide variety of reactions. However, preference is given to uniform C—C coupling reactions, for example the Suzuki condensation and the Stille condensation. In this context, the term "uniform C—C coupling reaction" is taken to mean that the linking to the polymer is determined by the position of the reactive groups in the corresponding monomers. This is given particularly well by the abovementioned reactions, which are very highly suitable owing to the clean course. Also suitable is nickel- or palladium-catalyzed coupling of halogenated aromatic compounds (Yamamoto coupling). Less suitable, by contrast, are oxidative processes (for example oxidative coupling using Fe(III) salts) since these result in links which are less well defined.

The above comments also result in the preferred choice of monomers: these represent corresponding bishalogen, bispseudohalogen (i.e. in the sense of this invention e.g. bistriflate, bisnonaflate or bistosylate), bisboronic acid, bisstannate, monohalomonoboronic acid and monohalomonostannate derivatives of the compounds of the formula (I) and formula (II).

The synthesis of the polymers according to the invention is shown in illustrative terms by Scheme 1 below:

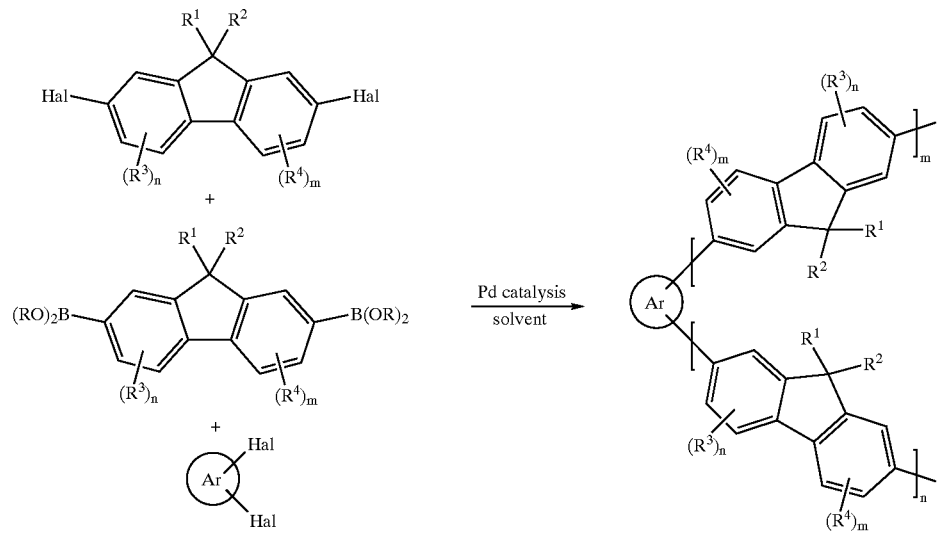

Scheme 1 shows polymerization by Suzuki coupling. It is expressly pointed out that this is merely one possible embodiment. Other combinations of boronic acid derivatives and halogens/pseudohalogens are of course also feasible. The Stille polymerization can also be carried out analogously using corresponding tin compounds.

The Suzuki polymerization should be carried out as follows:

The monomers on which the structural units of the formulae (I) and (II) are based (and, if desired, further additional monomers containing corresponding active leaving groups) are reacted in an inert solvent at a temperature in the range from 0° C. to 200° C. in the presence of a palladium-containing catalyst.

It must be ensured here that the totality of all monomers used has a highly balanced ratio of boronic acid functions to halogen or pseudohalogen functions. In addition, it may prove advantageous to remove any excess reactive groups at the end of the reaction by end-capping with monofunctional reagents.

In order to carry out the above reaction with boronic acids (esters), the aromatic boron compounds, the aromatic halogen compounds, a base and catalytic amounts of the palladium catalyst are introduced into water or into one or more inert organic solvents or preferably into a mixture of water and one or more inert organic solvents, and stirred at a temperature of from 0 to 200° C., preferably from 30 to 170° C., particularly preferably from 50 to 150° C., especially preferably from 60° C. to 120° C., for a period of from 1 hour to 200 hours, preferably from 5 hours to 150 hours, particularly preferably from 24 hours to 120 hours. It may also prove advantageous here to meter in one type of monomer (for example a bisboronic acid derivative) continuously or batchwise slowly over an extended period in order thus to regulate the molecular weight. The crude product can be purified by methods known to the person skilled in the art and appropriate for the respective polymer, for example repeated re-precipitation or even by dialysis.

Suitable organic solvents for the process described are, for example, ethers, for example diethyl ether, dimethoxyethane, diethylene glycol dimethyl ether, tetrahydrofuran, dioxane, dioxolane, diisopropyl ether and tert-butyl methyl ether, hydrocarbons, for example hexane, isohexane, heptane, cyclohexane, toluene and xylene, alcohols, for example methanol, ethanol, 1-propanol, 2-propanol, ethylene glycol, 1-butanol, 2-butanol and tert-butanol, ketones, for example acetone, ethyl methyl ketone and isobutyl methyl ketone, amides, for example dimethylformamide, dimethylacetamide and N-methylpyrrolidone, nitriles, for example acetonitrile, propionitrile and butyronitrile, and mixtures thereof.

Preferred organic solvents are ethers, such as dimethoxyethane, diethylene glycol dimethyl ether, tetrahydrofuran, dioxane, diisopropyl ether and t-butyl methyl ether, hydrocarbons, such as hexane, heptane, cyclohexane, toluene and xylene, alcohols, such as methanol, ethanol, 1-propanol, 2-propanol, 1-butanol, 2-butanol, tert-butanol and ethylene glycol, ketones, such as ethyl methyl ketone and isobutyl methyl ketone, amides, such as dimethylformamide, dimethylacetamide and N-methylpyrrolidone, and mixtures thereof.

Particularly preferred solvents are ethers, for example dimethoxyethane and tetrahydrofuran, hydrocarbons, for example cyclohexane, toluene and xylene, alcohols, for example ethanol, 1-propanol, 2-propanol, 1-butanol and tert-butanol, and mixtures thereof.

In a particularly preferred variant, water and one or more solvents are employed in the process described. Examples are mixtures of water and toluene, water, toluene and tetrahydrofuran, and water, toluene and ethanol.

Bases which are preferably used in the process described are alkali metal and alkaline earth metal hydroxides, alkali metal and alkaline earth metal carbonates, alkali metal hydrogencarbonates, alkali metal and alkaline earth metal acetates, alkali metal and alkaline earth metal alkoxides and primary, secondary and tertiary amines. Particular preference is given to alkali metal and alkaline earth metal hydroxides, alkali metal and alkaline earth metal carbonates and alkali metal hydrogencarbonates.

Special preference is given to alkali metal hydroxides, such as sodium hydroxide and potassium hydroxide, and alkali metal carbonates and alkali metal hydrogencarbonates, such as lithium carbonate, sodium carbonate and potassium carbonate.

The base is preferably employed in the process described in a proportion of from 100 to 1000 mol %, particularly preferably from 100 to 500 mol %, very particularly preferably from 150 to 400 mol %, especially from 180 to 250 mol %, based on boron groups.

The palladium catalyst contains palladium metal or a palladium(0) or (II) compound and a complex ligand, preferably a phosphine ligand. The two components can form a compound, for example the particularly preferred Pd(PPh3)4, or be employed separately.

Examples of suitable palladium components are palladium compounds, such as palladium ketonates, palladium acetylacetonates, nitrilopalladium halides, olefinpalladium halides, palladium halides, allylpalladium halides and palladium biscarboxylates, preferably palladium ketonates, palladium acetylacetonates, bis-$\eta^2$-olefinpalladium dihalides, palladium(II) halides,. $\eta^3$-allylpalladium halide dimers and palladium biscarboxylates, very particularly preferably bis(dibenzylideneacetone)palladium(0) [Pd(dba)$_2$)], Pd(dba)$_2$ CHCl$_3$, palladium bisacetylacetonate, bis(benzonitrile) palladium dichloride, PdCl$_2$, Na$_2$PdCl$_4$, dichlorobis(dimethyl sulfoxide)palladium(II), bis(acetonitrile) palladium dichloride, palladium(II) acetate, palladium(II) propionate, palladium(II) butanoate and (1c,5c-cyclooctadienyl)palladium dichloride.

The catalyst used can likewise be palladium in metallic form, referred to below simply as palladium, preferably palladium in colloidal or powdered form or on a support material, for example palladium on activated carbon, palladium on aluminum oxide, palladium on barium carbonate, palladium on barium sulfate, palladium on aluminum silicates, such as montmorillonite, palladium on SiO$_2$ and palladium on calcium carbonate, in each case having a palladium content of from 0.5 to 10% by weight. Particular preference is given to palladium in powdered form, palladium on activated carbon, palladium on barium carbonate and/or calcium carbonate and palladium on barium sulfate, in each case having a palladium content of from 0.5 to 10% by weight. Special preference is given to palladium on activated carbon having a palladium content of 5 or 10% by weight.

The palladium catalyst is employed in the process according to invention in a proportion of from 0.01 to 10 mol %, preferably from 0.05 to 5 mol %, particularly preferably from 0.1 to 3 mol %, especially preferably from 0.1 to 1.5 mol %, based on the halogen groups.

Examples of ligands which are suitable for the process are phosphines, such as trialkylphosphines, tricycloalkylphosphines and triarylphosphines, where the three substituents on the phosphorus may be identical or different and chiral or achiral and where one or more of the ligands can link the phosphorus groups of a plurality of phosphines and where part of this link can also be one or more metal atoms.

Examples of phosphines which can be used in the process described here are trimethylphosphine, tributylphosphine, tricyclohexylphosphine, triphenylphosphine, tritolylphosphine, tris-(4-dimethylaminophenyl)-phosphine, bis(diphenylphosphino)methane, 1,2-bis (diphenylphosphino)-ethane, 1,3-bis(diphenylphosphino) propane and 1,1'-bis(diphenyl-phosphino)ferrocene.

Other suitable ligands are, for example, diketones, for example acetylacetone and octafluoroacetylacetone, and tert-amines, for example trimethylamine, triethylamine, tri-n-propylamine and triisopropylamine.

Preferred ligands are phosphines and diketones, particularly preferably phosphines.

Very particularly preferred ligands are triphenylphosphine, 1,2-bis(diphenylphosphino)ethane, 1,3-bis(diphenylphosphino)propane and 1,1'-bis (diphenylphosphino)ferrocene, in particular triphenylphosphine.

Also suitable for the process are water-soluble ligands which contain, for example, sulfonic acid salt and/or sulfonic acid radicals and/or carboxylic acid salt and/or carboxylic acid radicals and/or phosphonic acid salt and/or phosphonic acid radicals and/or phosphonium groups and/or peralkylammonium groups and/or hydroxyl groups and/or polyether groups having a suitable chain length.

Preferred classes of water-soluble ligands are phosphines substituted by the above groups, such as trialkylphosphines, tricycloalkylphosphines, triarylphosphines, dialkylarylphosphines, alkyldiarylphospines and heteroarylphosphines, such as tripyridylphosphine and trifurylphosphine, where the three substituents on the phosphorus may be identical or different and chiral or achiral and where one or more of the ligands can link the phosphorus groups of a plurality of phosphines and where part of this link can also be one or more metal atoms, phosphites, phosphinous acid esters and phosphonous acid esters, phosphors, dibenzophosphols, and cyclic and oligo- and polycyclic compounds containing phosphorus atoms.

The ligand is employed in the process in a proportion of from 0.1 to 20 mol %, preferably from 0.2 to 15 mol %, particularly preferably from 0.5 to 10 mol %, especially preferably from 1 to 6 mol %, based on the aromatic halogen groups. It is also possible, if desired, to employ mixtures of two or more different ligands.

Advantageous embodiments of the Suzuki variant of the process are described for low-molecular-weight couplings in, for example, WO 94/10105, EP-A-679 619, WO-A-694 530 and PCT/EP 96/03154, which are expressly incorporated herein by way of reference.

The Stille polymerization should be carried out as follows:

The monomers on which the structural units of the formulae (I) and (II) are based (and, if necessary, further additional monomers containing corresponding active leaving groups) are reacted in an inert solvent at a temperature in the range from 0° C. to 200° C. in the presence of a palladium-containing catalyst. It must be ensured here that the totality of all monomers used has a highly balanced ratio of organotin functions to halogen or pseudohalogen functions in order to achieve high degrees of polymerization. In addition, it may prove advantageous to remove any excess reactive groups at the end of the reaction by end-capping with monofunctional reagents.

A review of this reaction is given, for example, in J. K. Stille, Angew. Chemie Int. Ed. Engl. 1986, 25, 508.

In order to carry out the process, aromatic tin compounds and aromatic halogen compounds are preferably introduced into one or more inert organic solvents and stirred at a temperature of from 0 to 200° C., preferably from 30 to 170° C., particularly preferably from 50 to 150° C., especially preferably from 60° C. to 120° C., for a period of from 1 hour to 200 hours, preferably from 5 hours to 150 hours, particularly preferably from 24 hours to 120 hours. It may also prove advantageous here to meter in one type of monomer (for example a bisstannyl derivative) continuously or batchwise slowly over an extended period in order thus to regulate the molecular weight. The crude product can be purified by methods known to the person skilled in the art and appropriate for the respective polymer, for example repeated re-precipitation or even by dialysis.

Suitable organic solvents for the process described are, for example, ethers, for example diethyl ether, dimethoxyethane, diethylene glycol dimethyl ether, tetrahydrofuran, dioxane, dioxolane, diisopropyl ether and tert-butyl methyl ether, hydrocarbons, for example hexane, isohexane, heptane, cyclohexane, benzene, toluene and xylene, alcohols, for example methanol, ethanol, 1-propanol, 2-propanol, ethylene glycol, 1-butanol, 2-butanol and tert-butanol, ketones, for example acetone, ethyl methyl ketone and isobutyl methyl ketone, amides, for example dimethylformamide (DMF), dimethylacetamide and N-methylpyrrolidone, nitriles, for example acetonitrile, propionitrile and butyronitrile, and mixtures thereof.

Preferred organic solvents are ethers, such as dimethoxyethane, diethylene glycol dimethyl ether, tetrahydrofuran, dioxane and diisopropyl ether, hydrocarbons, such as hexane, heptane, cyclohexane, benzene, toluene and xylene, alcohols, such as methanol, ethanol, 1-propanol, 2-propanol, 1-butanol, 2-butanol, tert-butanol and ethylene glycol, ketones, such as ethyl methyl ketone, and amides, such as DMF.

Particularly preferred solvents are amides, very particularly preferably DMF.

The palladium and phosphine components should be selected analogously to the description for the Suzuki variant.

Examples of monomers are shown in Scheme 2 below:

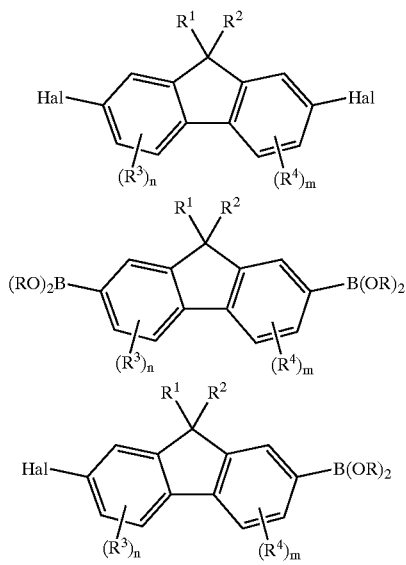

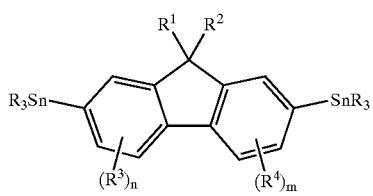

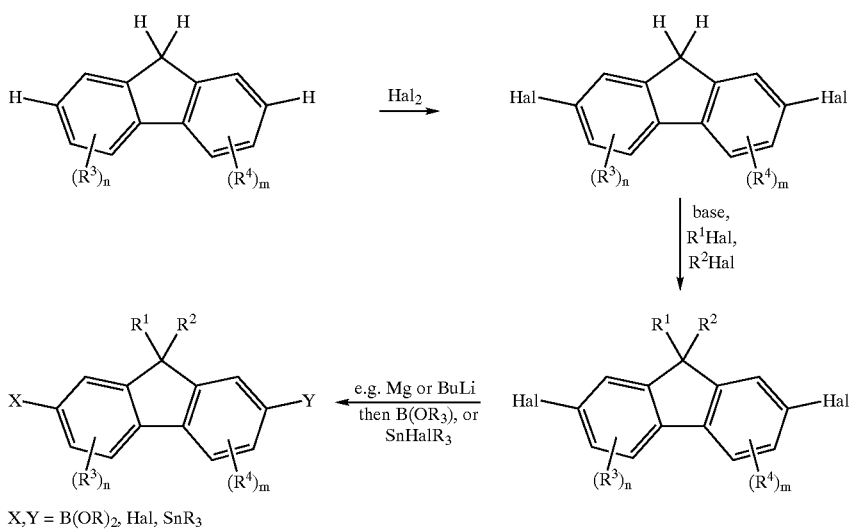

The suitable monomers can be synthesized, for example, as described in Scheme 3 below:

A) 9,9-Dialkylfluorene Monomers:

Monomers of this type can be synthesized, for example, as shown in Scheme 3 below:

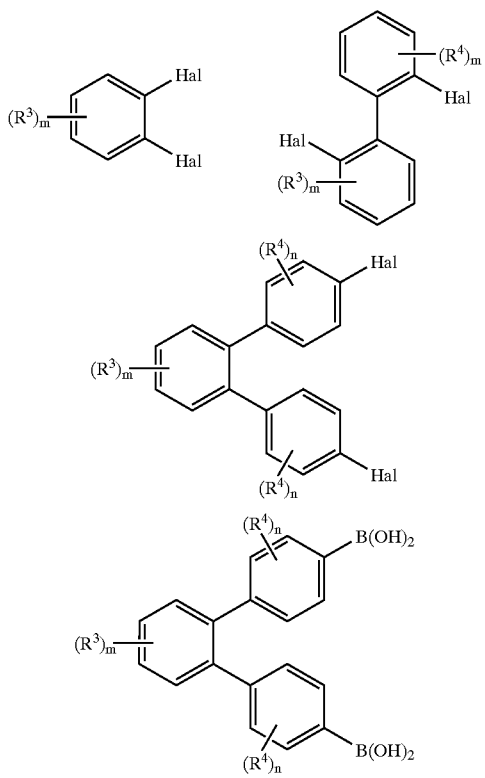

According to this, simple fluorene derivatives are halogenated. For m and n=0, this corresponds to the halogenation of fluorene. 2,7-Dibromo-fluorene is commercially available (for example Aldrich). It is possible subsequently to introduce two identical or even two different alkyl chains in the 9-position by first deprotonation followed by nucleophilic substitution with suitable alkyl halides. This can be carried out in accordance with the descriptions in WO 97/05184 and WO 97/33323.

The resultant compounds (bishalofluorene compounds) can be used as monomers as they are. Further reaction (metallation with subsequent reaction either with borates or trialkyltin halide) enables further monomers to be obtained: fluorenebisboronic acid derivatives, fluorene bisstannates or, with corresponding stoichiometry, also monohalofluorenemonoboronic acid derivatives or monohalofluorene monostannates. These last-mentioned reactions can be carried out by standard methods, as described, for example, in WO 98/27136.

B) 9-Alkyl-9-arylfluorene Monomers:

Monomers of this type can be synthesized, for example, in accordance with Scheme 4 below:

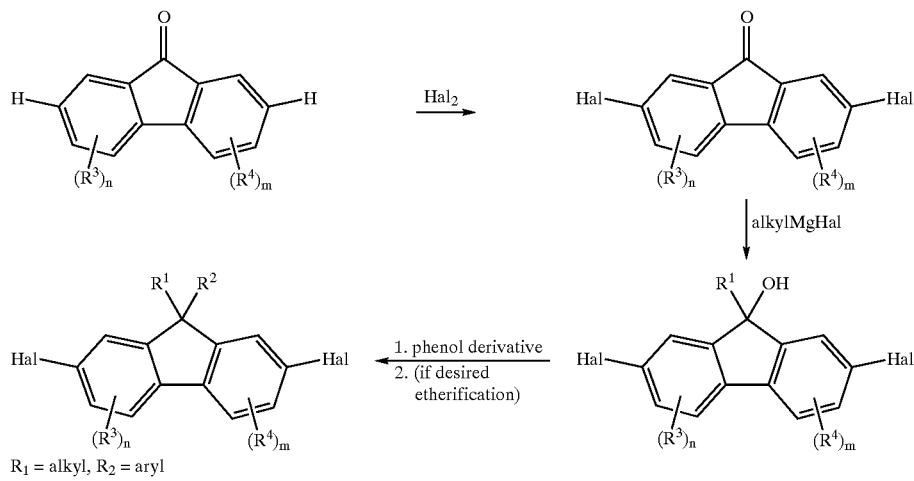

According to this, simple fluorenone derivatives are halogenated. For m and n=0, this corresponds to the halogenation of fluorenone. 2,7-Dibromofluorenone, for example, is commercially available (for example Aldrich). It is possible subsequently to introduce an alkyl chain by a standard Grignard reaction. This can be carried out, for example, as described in Organikum (15th Edition, 1977, page 623).

A phenol derivative can subsequently be added on with acid catalysis. This is possible analogously to the descriptions in WO 92107812. The resultant compound can then be etherified if desired. This can be carried out, for example, by the Williamson method (cf. Organikum, 15th Edition, 1977, page 253).

As mentioned above for the 9,9-dialkylfluorene monomers, a further reaction is also possible here to give the corresponding fluorenebisboronic acid derivatives, fluorene bisstannates or monohalofluorenemonoboronic acid derivatives or monohalofluorene monostannates.

C) 9,9-Diarylfluorene Monomers:

Monomers of this type can be synthesized, for example, in accordance with the two routes shown in Scheme 5 below:

Starting from bishalogenated fluorenone derivatives (cf. description relating to Scheme 4), firstly 4,4'-dihalobiphenyl-2-carboxylate derivatives can be obtained as intermediate by basic ring-opening with subsequent esterification. These compounds can then be converted into the desired fluorene monomers by reaction with aryl-Grignard reagents followed by acidic cyclization. Alternatively, the bishalogenated fluorenone derivative can be reacted directly with phenol derivatives in accordance with WO 92/07812 and subsequently converted into the desired fluorene monomer by etherification. As mentioned above for the 9,9-dialkylfluorene monomers, a further reaction is also possible here to give the corresponding fluorenebisboronic acid derivatives, fluorene bisstannates or monohalofluorenemonoboronic acid derivatives or monohalofluorene monostannates.

D) Monomers Based on the Structural Unit of the Formula (II):

As already described above, a multiplicity of structural units satisfy the requirements directed toward corresponding monomers. By way of example, the synthesis of some of

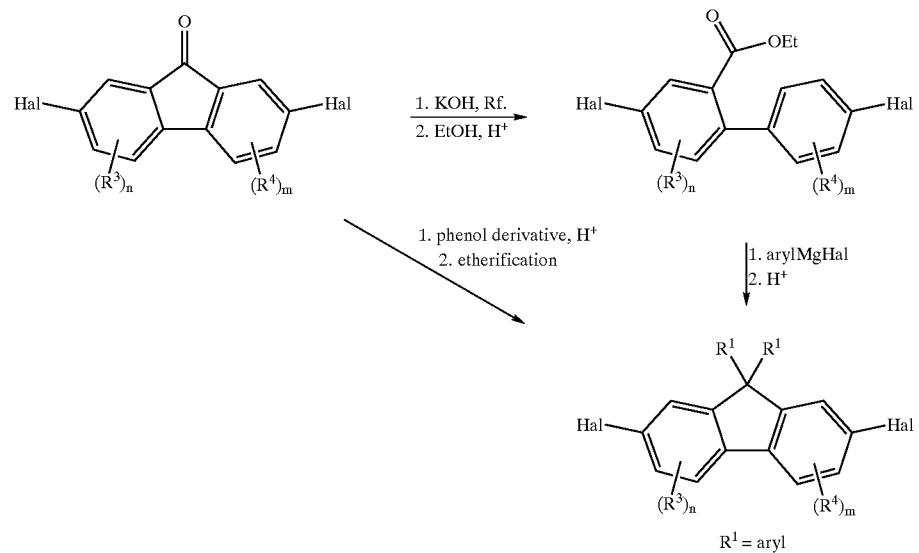

these classes of compound will be discussed here. For persons skilled in the art, however, the synthesis of further compounds of this type does not represent an unusual task, since many of these compounds (or simple derivatives thereof) have already been described in detail in the organic synthesis literature.

(a) Synthesis of Monomers giving 1,2-phenylene Structural Units:

It should firstly be pointed out here that even commercially available o-dibromobenzene can be used as comonomer so long as the proportion is not set too high, since otherwise solubility problems in the polymer can be expected. Simple derivatives thereof are either likewise commercially available (at least as fine chemicals) or easy to prepare.

Suitable for good solubility are principally derivatives containing relatively long alkyl or alkoxy chains. In Scheme 6 below, the synthesis of a class of compounds of this type is illustrated by way of example.

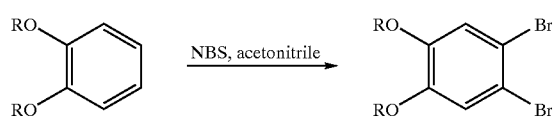

Pyrocatechol diethers can be prepared by simple etherification with any desired substitution. Bromination thereof using N-bromosuccinimide in acetonitrile (with corresponding stoichiometry) makes the corresponding 4,5-dibromopyrocatechol diethers very readily accessible.

As mentioned above for the 9,9-dialkylfluorene monomers, a further reaction is also possible here to give the corresponding pyrocatecholbisboronic acid derivatives, pyrocatechol bisstannates or monohalopyrocatechol-monoboronic acid derivatives or monohalopyrocatechol monostannates.

(b) Synthesis of Monomers giving 4,4"-o-terphenylene Structural Units:

Simple access to 1,2-asymmetrical hexaphenylbenzene derivatives is the obvious way of obtaining these compounds readily. This synthetic route is shown in Scheme 7 below:

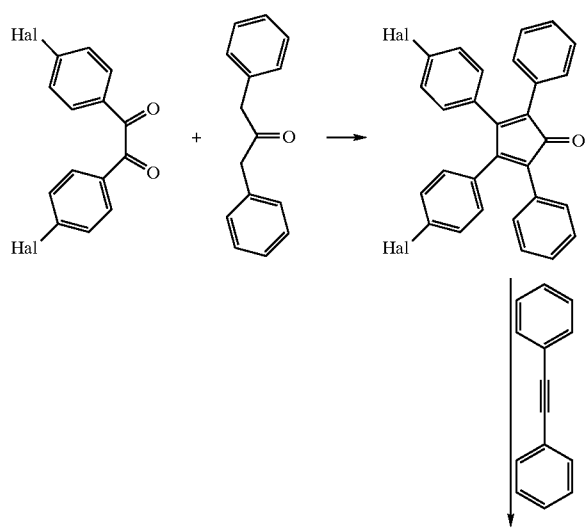

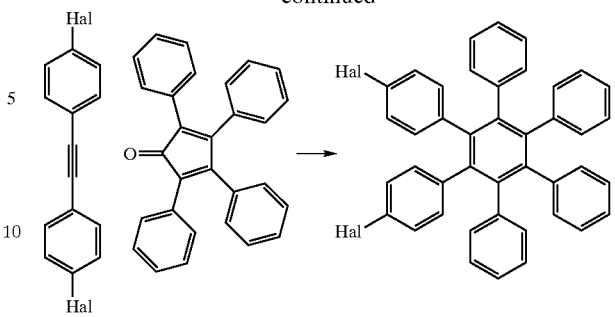

Either a cycloaddition (with simultaneous elimination of CO) starting from commercial tetracyclone with corresponding 4,4'-dihalotolans is possible or the inverse route, in which firstly the corresponding dihalotetracyclone is prepared starting from commercial precursors (4,4'-dihalobibenzyl or diphenylacetone), and this is then cyclized using commercial tolan.

As mentioned above for the 9,9-dialkylfluorene monomers, a further reaction is also possible here to give the corresponding bisboronic acid derivatives, bisstannates or monohalomonoboronic acid derivatives or monohalo monostannates.

This has shown that monomers which are preferably converted into polymers according to invention by the polymerization methods described above are readily accessible.

The polymers obtained in this way are very particularly preferably suitable as organic semiconductors and in particular as electroluminescent materials.

For the purposes of the present invention, the term "electroluminescent materials" is taken to mean materials which can be used as the active layer in an electroluminescent device. "Active layer" means that the layer is capable of emitting light on application of an electric field (light-emitting layer) and/or that it improves the injection and/or transport of positive and/or negative charges (charge injection or charge transport layer).

The invention therefore also relates to the use of a polymer according to the invention as electroluminescent material and as organic semiconductor.

In order to be used as electroluminescent materials, the polymers according to invention are generally applied to a substrate in the form of a film by known methods which are customary to the person skilled in the art, such as dipping or spin coating.

The invention thus likewise relates to an electroluminescent device having one or more active layers, where at least one of these active layers comprises one or more polymers according to the invention. The active layer can be, for example, a light-emitting layer and/or transport layer and/or a charge injection layer.

The general construction of such electroluminescent devices is described, for example, in U.S. Pat. Nos. 4,539,507 and 5,151,629. Electroluminescent devices containing polymers are described, for example, in WO 90/13148 and EP-A-0 443 861.

They usually contain an electroluminescent layer between a cathode and n anode, at least one of the electrodes being transparent. In addition, one or more electron injection and/or electron transport layers can be installed between the electroluminescent layer and the cathode and/or one or more hole injection and/or hole transport layers can be installed between the electroluminescent layer and the anode. The cathode can preferably be a metal or metallic alloy, for example Ca, Sr, Ba, Mg, Al, In or Mg/Ag. The anode can be a metal, for example Au, or another substance which conducts in a metallic manner, such as an oxide, for example ITO (indium oxide/tin oxide), on a transparent substrate, for example of glass or transparent polymer.

In operation, the cathode is set to a negative potential compared with the anode. Electrons are injected by the cathode into the electron injection layer/electron transport layer or directly into the light-emitting layer. At the same time, holes are injected by the anode into the hole injection layer/hole transport layer or directly into the light-emitting layer.

The injected charge carriers move toward one another through the active layers under the influence of the applied voltage. This results in electron/hole pairs at the interface between the charge transport layer and the light-emitting layer or within the light-emitting layer; these pairs recombine with emission of light. The color of the emitted light can be varied through the materials used as light-emitting layer.

Electroluminescent devices are used, for example, as self-illuminating display elements, such as control lamps, alphanumeric displays, monochromic or multichromic matrix displays, signs, electro-optical storage media and in opto-electronic couplers.

Various documents are cited in the present application, in order, for example, to illustrate the technical background to the invention. All these documents are expressly incorporated herein by way of reference.

The invention is described in greater detail by the examples, without this being intended to represent a limitation.

Synthesis of the Monomers

Preparation of the Monomers of Type (I)

EXAMPLE M1

Preparation of 2,7-dibromo-9,9-bis(2-ethylhexyl) fluorene

The preparation was carried out analogously to Example 1 of WO 97/05184. The product (84% yield) was isolated as a high-viscosity, pale yellow oil by bidistillation in a short-path evaporator [$10^{-3}$ mbar; 1st distillation (for removing excess ethylhexyl bromide and residual DMSO) 100° C; 2nd distillation: 155° C.]. $^1$H-NMR (CDCl$_3$): [ppm]$\delta$=7.54–7.43 (m, 6H, H-aryl); 1.93 (d with Fs., 4 H, J=4.0 Hz); 1.0–0.65 (m, 22H, H-alkyl); 0.58–0.45 (m, 8H, H-alkyl).

EXAMPLE M2

Preparation of 9,9-bis(2-ethylhexyl)fluorene-2,7-bisboronic acid

Magnesium (7.58 g, 312 mmol) was initially introduced, and a little iodine was added; the 2,7-dibromo-9,9-bis(2-ethylhexyl)fluorene (68.56 g, 125 mmol) was dissolved in 300 ml of dry THF in a dropping funnel. 30 ml of this solution was then added to the magnesium. The initiation of the reaction was evident from considerable exothermicity. The remainder of the bisbromide was subsequently added dropwise in THF in parallel (90 minutes, about 60° C.). When the addition was complete, the mixture was refluxed for about 5 hours.

In parallel, trimethyl borate (28.6 g, 0.27 mol) in THF (200 ml) was initially introduced and cooled to −75° C. At this temperature, the Grignard solution, which had been cooled to RT, was slowly added dropwise at such a rate that the temperature did not rise above −70° C. The mixture was subsequently slowly warmed to room temperature overnight with stirring.

The reaction solution was added to 300 ml of ice-water and 10 ml of concentrated sulfuric acid, and the organic phase was separated off. The organic phase was washed once with water. The combined organic phases were extracted with 150 ml of ethyl acetate. After the combined organic phases had been dried over Na$_2$SO$_4$, the mixture was evaporated in a rotary evaporator. The crude product was stirred with hexane/ethyl acetate/HCl (aq.) (200 mV30 ml/5 ml). Drying gave 45.8 g (77%) of the bisboronic acid.

This gave the crude bisboronic acid (containing variable amounts of various anhydrides). This was further purified by stirring three times with 300 ml of toluene each time.

$^1$H-NMR (DMSO-d$_6$): (NMR signals greatly broadened or doubled due to diastereomerism) $\delta$7.87 (m, 2 H, H-1), 7.75–7.68 (m, 4 H, H-3, H-4), 1.92 (m, 4 H, C—CH$_2$—), 0.85–0.42 (m (br), 22 H, H-alkyl), 0.40–0.25 (m (br), 8 H, H-alkyl).

EXAMPLE M3

Preparation of bisglycol 9,9-bis(2-ethylhexyl) fluorene-2,7-bisboronate

Magnesium (6.32 g, 0.26 mol) was initially introduced in 10 ml of THF, a little iodine was added, and a few drops of 2,7-dibromo-9,9-bis(2-ethylhexyl)fluorene were added. The initiation of the reaction was evident from considerable exothermicity. The remainder of the bisbromide (a total of 68.56 g, 0.125 mol) and 300 ml of THF were subsequently added dropwise in parallel. When the addition was complete, the mixture was refluxed for about 5 hours. Small amounts of Mg turnings were still evident. In parallel, trimethyl borate (28.6 g, 0.27 mol) in THF (200 ml) was initially introduced and cooled to −70° C. At this temperature, the Grignard solution was slowly added dropwise. The mixture was subsequently slowly warmed to room temperature overnight with stirring.

The reaction solution was added to 300 ml of ice-water and 10 ml of concentrated sulfuric acid, and the organic phase were separated off. The organic phase was then washed with water (neutral). After drying over Na$_2$SO$_4$, the mixture was evaporated in a rotary evaporator. The crude product was stirred with hexane (500 ml). This gave the crude bisboronic acid (containing variable amounts of various anhydrides).

This was esterified directly by refluxing (12 hours) in toluene with ethylene glycol and sulfuric acid on a water separator.

Yield over the two steps: 70–85%. Purity (NMR)>98.5%
$^1$H-NMR (CDCl$_3$): (NMR signals greatly broadened or doubled due to diastereomerism) $\delta$=7.86 (m, 2 H, H-1), 7.79 (m, 2 H, H-3), 7.73 (d, 2 H, H-4, J=8 Hz), 4.38 (s (br), 8 H, O—CH$_2$), 2.02 (m, 4 H, C—CH$_2$—), 0.75 (m (br), 22 H, H-alkyl), 0.47 (m (br), 8 H, H-alkyl).

Preparation of the Monomers of Type (II)

EXAMPLE M4

Preparation of 4,5-dibromopyrocatechol bisisobutyl ether

The preparation was carried out analogously to Example B5 (b) of WO 98/27136. Only a two-fold excess of bromine was used. The product was obtained as a solid (76%) by vacuum distillation using a Vigreux column. $^1$H-NMR (CDCl$_3$): 7.05 (ps-s, 2 H, H-aryl), 3.70 (d, 4 H, O—CH$_2$, J=7.5 Hz), 2.13 (pseudo-nonet, 2 H, —CH—, J=7.5 Hz), 1.03 (t, 12 H, CH$_3$, J=7.5 Hz).

EXAMPLE M5

Preparation of 1,2-bis(4-bromophenyl)-3,4,5,6-tetraphenyl-benzene (1) 3,4-Bis(4-bromophenyl)-2,5-diphenylcyclopentadienone:

46 g (112 mmol) of 4,4'-dibromobenzil and 23.7 g (112 mmol) of 1,3-diphenylacetone were heated to the boiling point in 300 ml of toluene. Addition of 250 ml of triethylene glycol finally gave a clear solution at 120° C. 11.3 ml of ethanolic benzyltrimethylammonium hydroxide solution (40%) were added, and the heating was removed. The highly exothermic reaction proceeded very quickly. The reaction batch became black. After 10 minutes, the reaction was terminated. The toluene was removed in a rotary evaporator, and the solid which remained was filtered off with suction at room temperature and washed a number of times with MeOH. Drying under reduced pressure gave 57 g of brown-violet crystals (94%). Melting point: 245° C.
(2)1,2-Bis(4-bromophenyl)-3,4,5,6-tetraphenylbenzene:

81 g of 3,4-bis(4-bromophenyl)-2,5-diphenylcyclopentadienone (150 mmol) and 32 g of tolan (180 mmol) were dissolved in 300 g of molten benzophenone and carefully heated to 320° C. (during this heating, vigorous evolution of CO occurred from 260° C.). The batch was gently refluxed for about 2 hours and then cooled, and finally 100 g of diphenyl ether were added at 80° C. After cooling, the resultant crystals (product with benzophenone and a little tolan) were filtered off with suction, rinsed with a little toluene and finally recrystallized again from toluene. Drying under reduced pressure at 60° C. gave 83 g (80%) of clean product. $^1$H-NMR (CDCl$_3$): 7.02, 6.68 (AA'BB', 4+4 H, Br-phenyl-H), 6.83 (m (br), 20 H, phenyl-H).

Synthesis of the Polymers

EXAMPLE P1

Copolymerization of 2,7-dibromo-9,9-bis(2-ethylhexyl) fluorene, 9,9-bis(2-ethylhexyl)fluorene-2,7-bisboronic acid and 10 mol % of 1,2-bis(4-bromo-phenyl)-3,4,5,6-tetraphenylbenzene by the Suzuki reaction (polymer P1).

8.78 g (16 mmol) of 2,7-dibromo-9,9-bis(2-ethylhexyl) fluorene, 2.77 g of 1,2-bis(4'-bromophenyl)-3,4,5,6-tetraphenylbenzene (4 mmol) and 11.61 g of K$_2$CO$_3$ (84 mmol) were dissolved in 25 ml of toluene and 25 ml of water and aerated with N$_2$. 7 g (14.6 mmol) of 9,9-bis(2-ethylhexyl)fluorene-2,7-bisboronic acid and 200 mg of Pd(PPh$_3$)$_4$ (0.17 mmol) were added under a protective gas. The yellow-brownish, cloudy suspension was stirred vigorously at an internal temperature of 87° C. under an N$_2$ blanket. On each of the following three days, 1 g (2.1 mmol) of the diboronic acid were added. After 3 days, a further 25 ml of toluene were added to the very viscous mixture. After a total of 4 days, the mixture was worked up.

The reaction solution was diluted with 150 ml of toluene, and the solution was stirred for 3 hours with 200 ml of 2% aqueous NaCN. During this operation, the mixture became almost completely colorless. The batch was transferred into a separating funnel under a protective gas. The organic phase with washed with H$_2$O and precipitated by addition of 500 ml of ethanol.

The polymer was dissolved in 635 ml of THF at 40° C. for 1 hour and precipitated using 640 ml of MeOH, washed and dried under reduced pressure (8.13 g). The product was re-precipitated again from 405 ml of THF/400 ml of methanol, filtered off with suction and dried to constant weight, giving 6.94 g (43%) of the polymer P1 as a pale yellow solid. $^1$H-NMR (CDCl$_3$): [ppm] δ=7.9-7.3 (m, 6 H, H-fluorene); 7.2–6.8 (m, 28H:10, H-phenyl); 2.2–1.9 (m, 4H, C(9)-CH$_2$-fluorene); 1.1–0.4 (m, 30 H, H-alkyl-fluorene). The proportion of the hexaphenylbenzene unit was determined as 10 mol % by integrating the signals at 7.9–7.3 ppm (fluorene) and 7.2–6.8 ppm (hexaphenylbenzene) and thus corresponds to the proportion of dibromide employed. GPC: THF+0.25% oxalic acid; column set SDV500, SDV 1000, SDV10000 (PPS), 35° C., UV detection 254 nm: $M_w$=118000 g/mol, $M_n$=61000 g/mol. UV-VIS (film): $\lambda_{max}$=376 nm PL (film): $\lambda_{max}$=420 nm, 445 nm

EXAMPLE P2

Copolymerization of 2,7-dibromo-9,9-bis(2-ethylhexyl)fluorene, 9,9-bis(2-ethylhexyl)fluorene-2,7-bisboronic acid and 5 mol % of 1,2-bis(4-bromo-phenyl)-3,4,5,6-tetraphenylbenzene by the Suzuki reaction (polymer P2).

Analogously to Example P1, 8.78 g (16 mmol) of 2,7-dibromo-9,9-bis(2-ethylhexyl)fluorene, 1.38 g of 1,2-bis(4'-bromophenyl)-3,4,5,6-tetraphenyl-benzene (2 mmol), 11.61 g of K$_2$CO$_3$ (84 mmol) and 200 mg of Pd(PPh$_3$)$_4$ (0.17 mmol) were reacted with a total of 10.05 g (21 mmol) of 9,9-bis(2-ethylhexyl)fluorene-2,7-bisboronic acid. 12.2 g (28.3 mmol, 78%) of polymer P2 were obtained as a yellow solid. The $^1$H-NMR corresponds to the product from Example P1; the proportion of the hexaphenylbenzene unit was determined as 5 mol % by integrating the signals at 7.9–7.3 ppm (fluorene) and 7.2–6.8 ppm (hexaphenylbenzene) and thus corresponds to the proportion of dibromide employed. GPC: THF+0.25% oxalic acid; column set SDV500, SDV 1000, SDV10000 (PPS), 35° C., UV detection 254 nm: $M_w$=125000 g/mol, $M_n$=71000 g/mol.

EXAMPLE P3

Copolymerization of 2,7-dibromo-9,9-bis(2-ethylhexyl)fluorene, 9,9-bis(2-ethylhexyl)fluorene-2,7-bisboronic acid and 20 mol % of 1,2-bis(4-bromophenyl)-3,4,5,6-tetraphenylbenzene by the Suzuki reaction (polymer P3).

Analogously to Example P1, 6.58 g (12 mmol) of 2,7-dibromo-9,9-bis(2-ethylhexyl)fluorene, 5.54 g of 1,2-bis(4'-bromophenyl)-3,4,5,6-tetraphenyl-benzene (8 mmol), 11.61 g of K$_2$CO$_3$ (84 mmol) and 200 mg of Pd(PPh$_3$)$_4$ (0.17 mmol) were reacted with a total of 10.05 g (21 mmol) of 9,9-bis(2-ethylhexyl)fluorene-2,7-bisboronic acid. 11.3 g (27.1 mmol, 67%) of polymer P3 were obtained as a yellow solid. The H-NMR corresponds to the product from Example P1; the proportion of the hexaphenylbenzene unit was determined as 20 mol % by integrating the signals at 7.9–7.3 ppm (fluorene) and 7.2–6.8 ppm (hexaphenylbenzene) and thus corresponds to the proportion of dibromide employed. GPC: THF+0.25% oxalic acid; column set SDV500, SDV 1000, SDV10000 (PPS), 35° C., UV detection 254 nm: $M_w$=111000 9/mol, $M_n$=65000 g/mol.

EXAMPLE P4

Copolymerization of 2,7-dibromo-9,9-bis(2-ethylhexyl)fluorene, 9,9-bis(2-ethylhexyl)fluorene-2,7-bisboronic acid and 10 mol % dibromopyrocatechol bisisobutyl ether by the Suzuki reaction (polymer P4).

8.78 9 (16 mmol) of 2,7-dibromo-9,9-bis(2-ethylhexyl) fluorene, 1.52 g (4 mmol) of dibromopyrocatechol bisisobutyl ether and 11.61 g of $K_2CO_3$ (84 mmol) were dissolved in 40 ml of toluene, 25 ml of water and 0,5 ml of ethanol and aerated with $N_2$. 9.09 g (19 mmol) of 9,9-bis(2ethylhexyl)-fluorene-2,7-bisboronic acid and 350 mg of $Pd(PPh_3)_4$ (0.30 mmol) were added under a protective gas. The yellow-brownish, cloudy suspension was stirred vigorously at an internal temperature of 87° C. under an $N_2$ blanket. On each of the following two days, 240 mg (0.5 mmol) of the diboronic acid were added. After a further two days, a further 0.85 g of the diboronic acid were added to the very viscous mixture. After heating for a further day, the mixture was worked up as described in Example P1. Yield: 4.50 g (12.1 mmol, 30%)

$^1$H-NMR (CDCl$_3$): [ppm] δ=7.9–7.3 (m, 6 H, H-fluorene); 7.1–6.8 (m, 2H/10, H-pyrocatechol); 3.9–3.8 (m, 4H/10, OCH$_2$-pyrocatechol), 2.2–1.9 (m, 4H, C(9)-CH$_2$-fluorene); 1.1–0.4 (m, 30 H, H-alkyl-fluorene/H-alkyl isobutyl). The proportion of the 4,5-diisobutoxy-1,2-phenylene unit was determined as 10 mol % by integrating the signals at 7.9–7.3 ppm (fluorene) and 3.9–3.8 ppm (diisobutoxy-1,2-phenylene unit) and thus corresponds to the proportion of starting materials employed. GPC: THF+0.25% oxalic acid; column set SDV500, SDV 1000, SDV10000 (PPS), 35° C., UV detection 254 nm: $M_w$=96000 g/mol, $M_n$=63000 g/mol. UV-VIS (film): $\lambda_{max}$=374 nm PL (film): $\lambda_{max}$=418 nm, 444 nm

EXAMPLE P5

Copolymerization of 2,7-dibromo-9,9-bis(2-ethylhexyl)-fluorene, 9,9-bis(2-ethylhexyl)fluorene-2,7-bisboronic acid and 35 mol % of 1,2-bis(4-bromophenyl)-3,4,5,6-tetraphenylbenzene by the Suzuki reaction (polymer P5).

Analogously to Example P1, 3.2907 g (6 mmol) of 2,7-dibromo-9,9-bis(2-ethylhexyl)fluorene, 9.695 g of 1,2-bis(4'-bromophenyl)-3,4,5,6-tetraphenyl-benzene (14 mmol), 11.61 g of $K_2CO_3$ (84 mmol) and 200 mg of $Pd(PPh_3)_4$ (0.17 mmol) were reacted with a total of 10.607 g (20 mmol) of bisglycol 9,9-bis(2-ethylhexyl)fluorene-2,7-bisboronate. 10.3 g (23.5 mmol, 59%) of polymer P5 were obtained as a pale yellow solid.

The $^1$H-NMR corresponds to the product from Example P1; the proportion of the hexaphenylbenzene unit was determined as 35 mol % by integrating the signals at 7.9–7.3 ppm (fluorene) and 7.2–6.8 ppm (hexaphenyl-benzene) and thus corresponds to the proportion of dibromide employed. GPC: THF+0.25% oxalic acid; column set SDV500, SDV 1000, SDV10000 (PPS), 35° C., UV detection 254 nm: $M_w$=56000 g/mol, $M_n$=32000 g/mol.

EXAMPLE P6

Copolymerization of 2,7-dibromo-9,9-bis(2-ethylhexyl)-fluorene, 9,9-bis(2-ethylhexyl)fluorene-2,7-bisboronic acid and 5 mol % of 1,2-bis(4-bromophenyl)-3,4,5,6-tetraphenylbenzene by the Suzuki reaction (polymer P6).

Analogously to Example P1, 9.872 g (18 mmol) of 2,7-dibromo-9,9-bis(2-ethylhexyl)fluorene, 1.385 g of 1,2-bis(4'-bromophenyl)-3,4,5,6-tetraphenyl-benzene (2 mmol), 11.61 g of $K_2CO_3$ (84 mmol) and 200 mg of $Pd(PPh_3)_4$ (0.17 mmol) were reacted with a total of 10.607 g (20 mmol) of bisglycol 9,9-bis(2-ethylhexyl)fluorene-2,7-bisboronate. 12.1 g (30.6 mmol, 76%) of polymer P6 were obtained as a pale yellow solid.

The $^1$H-NMR corresponds to the product from Example P1; the proportion of the hexaphenylbenzene unit was determined as 5 mol % by integrating the signals at 7.9–7.3 ppm (fluorene) and 7.2–6.8 ppm (hexaphenylbenzene) and thus corresponds to the proportion of dibromide employed. GPC: THF+0.25% oxalic acid; column set SDV500, SDV 1000, SDV10000 (PPS), 35° C., UV detection 254 nm: $M_w$=65000 g/mol, $M_n$=41000 g/mol.

Comparative Examples

EXAMPLE C1

Suzuki polymerization of 2,7-dibromo-9,9-bis(2-ethylhexyl)fluorene, 9,9-bis(2-ethylhexyl)fluorene-2,7-bisboronic acid (polymer C1l), preparation of poly-2,7-[9,9-bis(2-ethylhexyl)fluorene]

Analogously to Example P1, 10.97 g (20 mmol) of 2,7-dibromo-9,9-bis(2-ethylhexyl)fluorene, 11.61 g of $K_2CO_3$ (84 mmol) and 350 mg of $Pd(PPh_3)_4$ (0.30 mmol) were reacted with a total of 10.4 g (21 mmol) of 9,9-bis(2-ethylhexyl)fluorene-2,7-bisboronic acid. After a reaction time of 4 days, 4.72 g (12.1 mmol, 30%) of polymer C1 were obtained as a pale beige solid.

$^1$H-NMR (CDCl$_3$): [ppm] δ=7.9-7.3 (m, 6 H, H-aromatic); 2.15 (br. s, 4H, C(9)-CH$_2$); 1.1–0.4 (m, 30 H, H-alkyl). GPC: THF+0.25% oxalic acid; column set SDV500, SDV 1000, SDV10000 (PPS), 35° C., UV detection 254 nm: $M_w$=80000 g/mol, $M_n$=48000 g/mol. UV-VIS (film): $\lambda_{max}$=376 nm PL (film): $\lambda_{max}$=447 nm

EXAMPLE C2

Suzuki polymerization of 2,7-dibromo-9,9-bis(2-ethylhexyl)fluorene and bisglycol 9,9-bis(2-ethylhexyl)fluorene-2,7-bisboronate (polymer C2), preparation of poly-2,7-[9,9-bis(2-ethylhexyl)fluorene]

8.227g (15.00 mmol) of 2,7-dibromo-9,9-bis(2-ethylhexyl)fluorene, 7.956 g (15.00 mmol) of diethylene glycol 9,9-bis(2-ethylhexyl)fluorene-2,7-bisboronate, 8.71 g (63 mmol) of $K_2CO_3$, 25 ml of toluene and 15 ml of water were degassed for 30 min by passing $N_2$ through the mixture. 230 mg (0.2 mmol) of $Pd(PPh_3)_4$ were subsequently added under a protective gas. The suspension was stirred vigorously at an internal temperature of 87° C. (gentle reflux) under an $N_2$ blanket. After 2 days, a further 20 ml of toluene were added, and after a further 2 days, a further 0.20 g of diethylene glycol 9,9-bis(2-ethylhexyl) fluorene-2,7-bisboronate were added. After a further 6 hours, 0.5 ml of 4-bromofluorobenzene (end capping) was added, and the mixture was refluxed for a further 3 hours.

Work-up was carried out as described under Example P1, giving 3.85 g (9.9 mmol, 33%) of polymer $C_2$ a pale beige solid.

1H-NMR (CDCl$_3$): [ppm] δ=7.9–7.3 (m, 6 H, H-aromatic); 2.15 (br. s, 4H, C(9)-CH$_2$); 1.1–0.4 (m, 30 H, H-alkyl). GPC: THF +0.25% oxalic acid; column set SDV500, SDV 1000, SDV10000 (PPS), 35° C., UV detection 254 nm: $M_w$=70000 g/mol, $M_n$=34000 g/mol. UV-VIS (film): $\lambda_{max}$=376 nm PL (film): $\lambda_{max}$=420 nm, 444 nm Use of the polymers for luminescence applications:

Polymers P1 to P6 and C1 and C2 are all readily soluble in organic solvents, such as, for example, toluene and THF. Thin films can be produced from these solutions, for example by spin coating. These films then exhibit a bluish emission on UV excitation (366 nm).

If the films produced in this way are heated at above 150° C. under reduced pressure for an extended time (for example 2 hours), a clear shift in the PL band is observed in the case of polymers C1 and C2: the polymers then emit a greenish light on UV excitation. In addition, the emission becomes non-uniform, i.e. a marbled pattern occurs. By contrast, the emission color of polymers P1 to P4 remains virtually unchanged (shift by less than 20 nm). A similar behavior is also observed in EL devices: C1 and C2 exhibit a green emission from the beginning ($\lambda_{max}$ about 520 nm), while polymers P1 to P4 have a blue EL ($\lambda_{max}$ about 460 nm).

What is claimed is:

1. A conjugated polymer which comprises structural units of the formula (I) and formula (II)

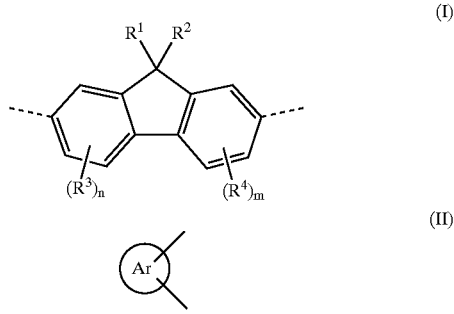

in which
$R^1$ and $R^2$ are identical or different and are hydrogen, $C_1$–$C_{22}$-alkyl, $C_2$–$C_{20}$-heteroaryl, $C_5$–$C_{20}$-aryl, F, Cl, CN, wherein said alkyl is branched, unbranched or alternatively is a cycloalkyl radical, and individual, non-adjacent $CH_2$ group(s) of said alkyl is optionally replaced by O, S, C=O, COO, N—$R^5$ or a simple aryl radical, wherein said above mentioned aryls are optionally substituted by one or more substituents $R^3$,
$R^3$ and $R^4$ are identical or different and are $C_1$–$C_{22}$-alkyl, $C_2$–$C_{20}$-heteroaryl, $C_5$–$C_{20}$-aryl, F, Cl, CN, $SO_3R^5$ or $NR^5R^6$, wherein the alkyl radical is branched, unbranched or alternatively is a cycloalkyl radical, and individual, non-adjacent $CH_2$ group(s) of the alkyl radical is optionally replaced by O, S, C=O, COO, N—$R^5$ or a simple aryl radical, wherein the above mentioned aryls are optionally substituted by one or more non-aromatic substituents $R^3$,
$R^5$ and $R^6$ are identical or different and are H, $C_1$–$C_{22}$-alkyl, $C_2$–$C_{20}$-heteroaryl or $C_5$–$C_{20}$-aryl, wherein the alkyl radicals are branched or unbranched or alternatively are cycloalkyl radicals, and individual, non-adjacent $CH_2$ groups of the alkyl radical are optionally replaced by O, S, C=O, COO, N—$R^5$ or a simple aryl radical, wherein the above mentioned aryls are optionally substituted by one or more non-aromatic substituents $R^3$, and
m and n are each an integer 0, 1, 2 or 3,
Ar is a mono- or polycyclic aromatic conjugated system having 5 to 20 carbon atoms, in which one or more carbon atoms are optionally replaced by nitrogen, oxygen or sulfur and whose linking points are selected so that an angle not equal to 180° is formed along the main polymer chain.

2. The polymer as claimed in claim 1 wherein $R^1$ and $R^2$ are both identical and are not hydrogen or chlorine.

3. The polymer as claimed in claim 1, wherein $R^1$ and $R^2$ are different from one another and are not hydrogen.

4. The polymer as claimed in claim 1, wherein m and n are identical or different and are an integer 0 or 1.

5. The polymer as claimed in claim 1, wherein the angle along the main polymer chain is less than 120° C.

6. The polymer as claimed in claim 5, wherein the angle along the main polymer chain is less than 120° C.

7. The polymer as claimed in claim 1, wherein the polymer according to the invention contains at least 1 mol % of structural units of the formula (II) incorporated randomly, periodically or alternately or in blocks.

8. The polymer as claimed in claim 1, wherein the polymer according to the invention comprises from 10 to 10,000 recurring units of the formulae (I) and (II).

9. An organic semiconductor which comprises the polymer as claimed in claim 1.

10. An electroluminescent device containing the polymer as claimed in claim 1.

11. The polymer as claimed in claim 1 wherein $R^2$ is $C_5$–$C_{20}$-aryl.

12. The polymer as claimed in claim 1 wherein $R^1$ and $R^2$ are different.

13. The polymer as claimed in claim 1 wherein n is an integer 1, 2 or 3.

14. The polymer as claimed in claim 1 wherein the structural unit of formula (II) is a benzene derivative incorporated into the polymer in the 1,2-position.

15. The polymer as claimed in claim 1 wherein the structural unit of formula (II) is a naphthalene derivative incorporated into the polymer in the 1,2-, 2,3- or 1,7-position.

16. The polymer as claimed in claim 1 wherein the structural unit of formula (II) is a anthracene derivative incorporated into the polymer in the 1,2-, 2,3-, 1,7- or 2,9-position.

17. The polymer as claimed in claim 1 wherein the structural unit of formula (II) is a phenanthrene derivative incorporated into the polymer in the 1,2-, 1,8-, 1,9-, 2,3-, 2,5-, 2,10-, 3,4-, 3,6-, 3,9-, 4,5- or 9,10-position.

18. The polymer as claimed in claim 1 wherein the structural unit of formula (II) is a biphenyl derivative incorporated into the polymer in the 2,2'- or 2,4'-position.

19. The polymer as claimed in claim 1 wherein the structural unit of formula (II) is a o-terphenyl derivative incorporated into the polymer in the 4,4"-position.

* * * * *

UNITED STATES PATENT AND TRADEMARK OFFICE
CERTIFICATE OF CORRECTION

PATENT NO. : 6,541,602 B1  Page 1 of 1
DATED : April 1, 2003
INVENTOR(S) : Heinrich Becker et al.

It is certified that error appears in the above-identified patent and that said Letters Patent is hereby corrected as shown below:

<u>Column 22,</u>
Line 17, delete "120°C" and insert -- 90°C --.

Signed and Sealed this

Nineteenth Day of August, 2003

JAMES E. ROGAN
*Director of the United States Patent and Trademark Office*